(12) United States Patent
Sakamoto et al.

(10) Patent No.: US 9,395,949 B2
(45) Date of Patent: Jul. 19, 2016

(54) APPARATUS, METHOD, AND DEVICE FOR ASSOCIATING INFORMATION WITH AN OBJECT

(71) Applicant: FUJITSU LIMITED, Kawasaki-shi, Kanagawa (JP)

(72) Inventors: Takuya Sakamoto, Kawasaki (JP); Hidenobu Ito, Kawasaki (JP); Kazuaki Nimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 151 days.

(21) Appl. No.: 14/280,754

(22) Filed: May 19, 2014

(65) Prior Publication Data
US 2014/0375686 A1 Dec. 25, 2014

(30) Foreign Application Priority Data
Jun. 19, 2013 (JP) ................................. 2013-129045

(51) Int. Cl.
G06F 3/147 (2006.01)
G06T 11/00 (2006.01)

(52) U.S. Cl.
CPC ............... *G06F 3/147* (2013.01); *G06T 11/00* (2013.01); *G09G 2340/12* (2013.01)

(58) Field of Classification Search
CPC ...................................................... G06F 3/147
See application file for complete search history.

(56) References Cited

U.S. PATENT DOCUMENTS

| 8,542,906 | B1* | 9/2013 | Persson ............... G06K 9/00671 382/103 |
| 2011/0258175 | A1* | 10/2011 | Kim .................. G06F 17/30864 707/709 |
| 2013/0178257 | A1* | 7/2013 | Langseth ................ G06T 17/05 463/4 |

FOREIGN PATENT DOCUMENTS

| JP | 2010-198104 | 9/2010 |
| JP | 2011-170682 | 9/2011 |

* cited by examiner

*Primary Examiner* — Maurice L McDowell, Jr.
*Assistant Examiner* — Donna J Ricks
(74) *Attorney, Agent, or Firm* — Oblon, McClelland, Maier & Neustadt, L.L.P.

(57) ABSTRACT

An apparatus includes a memory; and a processor coupled to the memory and configured to: receive a request of changing information that is displayed on an image in a superimposed manner corresponding to a position of an object included in the image; and associate second information with the object based on the request in place of first information displayed on the image in the superimposed manner corresponding to the position of the object.

17 Claims, 19 Drawing Sheets

| APPLICATION ID | APPLICATION NAME | APPLICATION FILE | KEYWORD |
|---|---|---|---|
| vvvv | minutes | vvvv.html | now |
| wwww | item 1 | wwww.html | item 1 |
| xxxx | item 2 | xxxx.html | item 2 |
| yyyy | check | yyyy.html | check |
| zzzz | agenda | zzzz.html | agenda |
| – | – | – | – |

| MARKER ID | IMAGE DATA | KEYWORD |
|---|---|---|
| aaaa | xxx.png | agenda |
| bbbb | yyy.png | now |
| — | — | — |

| DISPLAY POSITION ID | DISPLAY RANGE | | | | KEYWORD |
|---|---|---|---|---|---|
| | x | y | w | h | |
| 123 | 15 | 24 | 80 | 80 | agenda |
| 124 | 208 | 340 | 90 | 80 | now |
| — | — | — | — | — | — |

| SELECTION ITEM ID | DISPLAY RANGE | | | | APPLICATION ID |
|---|---|---|---|---|---|
| | x | y | w | h | |
| 001 | 15 | 10 | 80 | 30 | vvvv |
| 002 | 15 | 25 | 80 | 30 | wwww |
| 003 | 15 | 40 | 80 | 30 | xxxx |
| 004 | 15 | 55 | 80 | 30 | yyyy |
| – | – | – | – | – | – |

| APPLICATION ID | APPLICATION NAME | APPLICATION FILE | KEYWORD |
|---|---|---|---|
| vvvv | minutes | vvvv.html | minites |
| wwww | item 1 | wwww.html | now |
| xxxx | item 2 | xxxx.html | item |
| yyyy | check | yyyy.html | item |
| zzzz | agenda | zzzz.html | agenda |
| – | – | – | – |

APPARATUS, METHOD, AND DEVICE FOR ASSOCIATING INFORMATION WITH AN OBJECT

CROSS-REFERENCE TO RELATED APPLICATION

This application is based upon and claims the benefit of priority of the prior Japanese Patent Application No. 2013-129045, filed on Jun. 19, 2013, the entire contents of which are incorporated herein by reference.

FIELD

The embodiments discussed herein are related to an apparatus, a method, and a device.

BACKGROUND

In recent years, so-called augmented reality techniques have been developed. In an augmented reality technique, for example, visual information such as a character string, a picture, and the like are displayed in a superimposed manner on a marker (object) captured by a camera included in a mobile information terminal. In the augmented reality technique, an AR table that ties visual information to markers is prepared in advance, and when a marker is detected from a camera image, visual information tied to the marker is identified from the AR table, and the visual information is displayed in a superimposed manner on the marker included in the camera image. Accordingly, by merely taking a picture of a marker by a camera, it is possible for a user of a mobile information terminal to confirm the visual information tied to the marker any time. For example, if a marker is attached to a whiteboard and a conference material is tied to the marker, it is possible to display the conference material on the whiteboard.

Related-art techniques have been disclosed in Japanese Laid-open Patent Publication Nos. 2010-198104 and 2011-170682.

SUMMARY

According to an aspect of the invention, an apparatus includes a memory; and a processor coupled to the memory and configured to: receive a request of changing information that is displayed on an image in a superimposed manner corresponding to a position of an object included in the image; and associate second information with the object based on the request in place of first information displayed on the image in the superimposed manner corresponding to the position of the object.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a structure diagram of an application information table according to an embodiment;

FIG. 7 is a structure diagram of a display position information table according to an embodiment;

FIG. 8 is a structure diagram of a selection item information table according to an embodiment;

FIG. 12 is a structure diagram of an application information table according to an embodiment;

DESCRIPTION OF EMBODIMENTS

First, consideration of the inventors is described. In an augmented reality technique, visual information tied to a marker is identified using an AR table that is prepared in advance. Accordingly, visual information to be displayed in a superimposed manner on a marker is nothing but information that has been prepared in advance.

By an embodiment described later, visual information is flexibly provided.

An embodiment is described with reference to FIGS. 1 to 19.

In the present embodiment, a corresponding relationship between a marker and visual information (a display position and an application) that are recorded in an AR table (a corresponding information table) is rewritten based on specification of visual information by a user so that visual information to be displayed in a superimposed manner on the marker (displayed correspondingly) is changed. For example, by rewriting a conference material tied to a marker of a whiteboard to another conference material, a conference material to be displayed in a superimposed manner on the marker, that is to say, a conference material to be displayed on the whiteboard is changed to the other conference material.

Schematic Diagram of Application Push System

Figure 1:
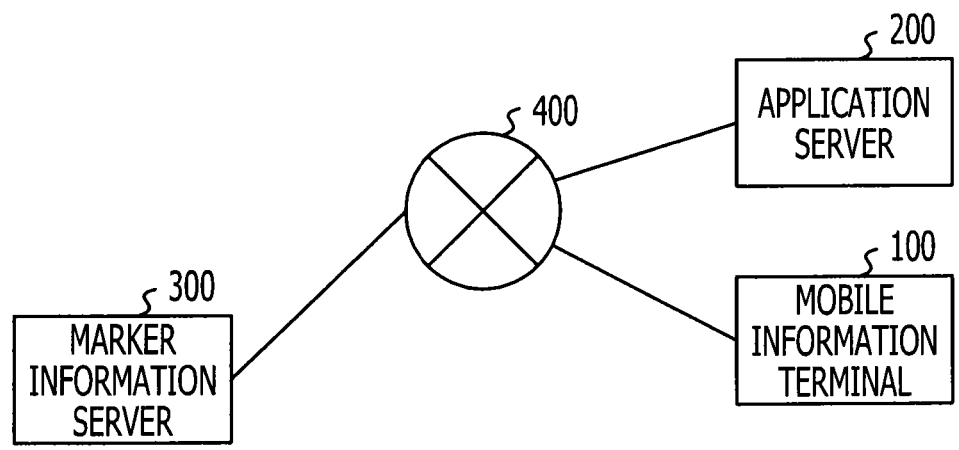
FIG. 1 is a schematic diagram of an application push system according to an embodiment.

FIG. 1 is a schematic diagram of an application push system according to an embodiment.

As illustrated in FIG. 1, an application push system according to the present embodiment includes a mobile information terminal 100, an application server 200, and a marker information server 300. The mobile information terminal 100, the application server 200, and the marker information server 300 are mutually connected through a wireless or wired network 400, for example. In the application push system, an application is automatically downloaded from the application server 200 to the mobile information terminal 100. Here, an "application" is an example of a content including data and the like, and it is not typically a so-called application program.

Hardware configuration of mobile information terminal 100

Figure 2:
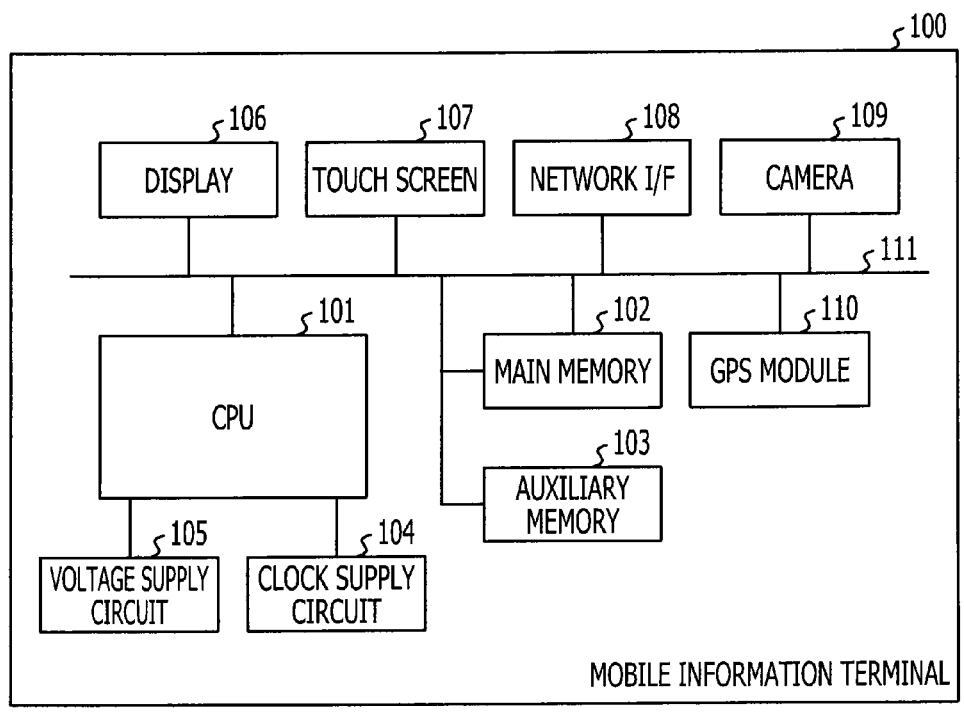
FIG. 2 is a schematic diagram of a hardware configuration of a mobile information terminal according to an embodiment.

FIG. 2 is a schematic diagram of a hardware configuration of the mobile information terminal 100 according to an embodiment.

As illustrated in FIG. 2, the mobile information terminal 100 according to the present embodiment includes a central processing unit (CPU) 101, a main memory 102, an auxiliary memory 103, a clock supply circuit 104, a voltage supply circuit 105, a display 106, a touch screen 107, a network interface (I/F) 108, a camera 109, and a GPS module 110 as hardware modules. These hardware modules are mutually connected through a bus 111, for example.

The CPU 101 operates by the clock signal supplied from the clock supply circuit 104 and the voltage supplied from the voltage supply circuit 105, and controls various hardware modules of the mobile information terminal 100. Further, the CPU 101 reads various programs stored in the auxiliary memory 103, loads the various programs to the main memory 102, and executes the various programs loaded in the main memory 102 so as to achieve various functions. The details of the various functions are described later.

The main memory 102 stores various programs to be executed by the CPU 101. Further, the main memory 102 is used as a work area of the CPU 101, and stores various kinds of data that is desired for processing by the CPU 101. For the main memory 102, a random access memory (RAM), and so on may be used, for example.

The auxiliary memory 103 stores various programs that operate the mobile information terminal 100. For the various programs, for example, application programs that are executed by the mobile information terminal 100, operating system (OS), and the like are provided. An AR application (control program) according to the present embodiment is also stored in the auxiliary memory 103. For the auxiliary memory 103, for example, a hard disk, a non-volatile memory, such as a flash memory, and so on may be used.

The display 106 is controlled by the CPU 101, and displays image information to a user. The touch screen 107 is attached to the display 106, and is used to input position information of a contact position of a fingertip of a user or a pen point, for example.

The network I/F 108 functions, for example, as an interface for receiving a push message and an application (an application file and application information) from the application server 200, or as an interface for receiving marker information from the marker information server 300.

The camera 109 obtains image information about a view in a conference room, and so on, for example. The GPS module 110 obtains position information (a longitude, a latitude, and so on) of the mobile information terminal 100 based on GPS signals from a plurality of artificial satellites. In this regard, in the present embodiment, the position information of the mobile information terminal 100 is obtained based on the GPS signals. However, the position information of the mobile information terminal 100 may be obtained based on, for example, a cell-ID from a third generation (3G) base station, a MAC address from an access point of Wi-Fi (a registered trademark), and so on.

Functional Blocks of Mobile Information Terminal 100

Figure 3:
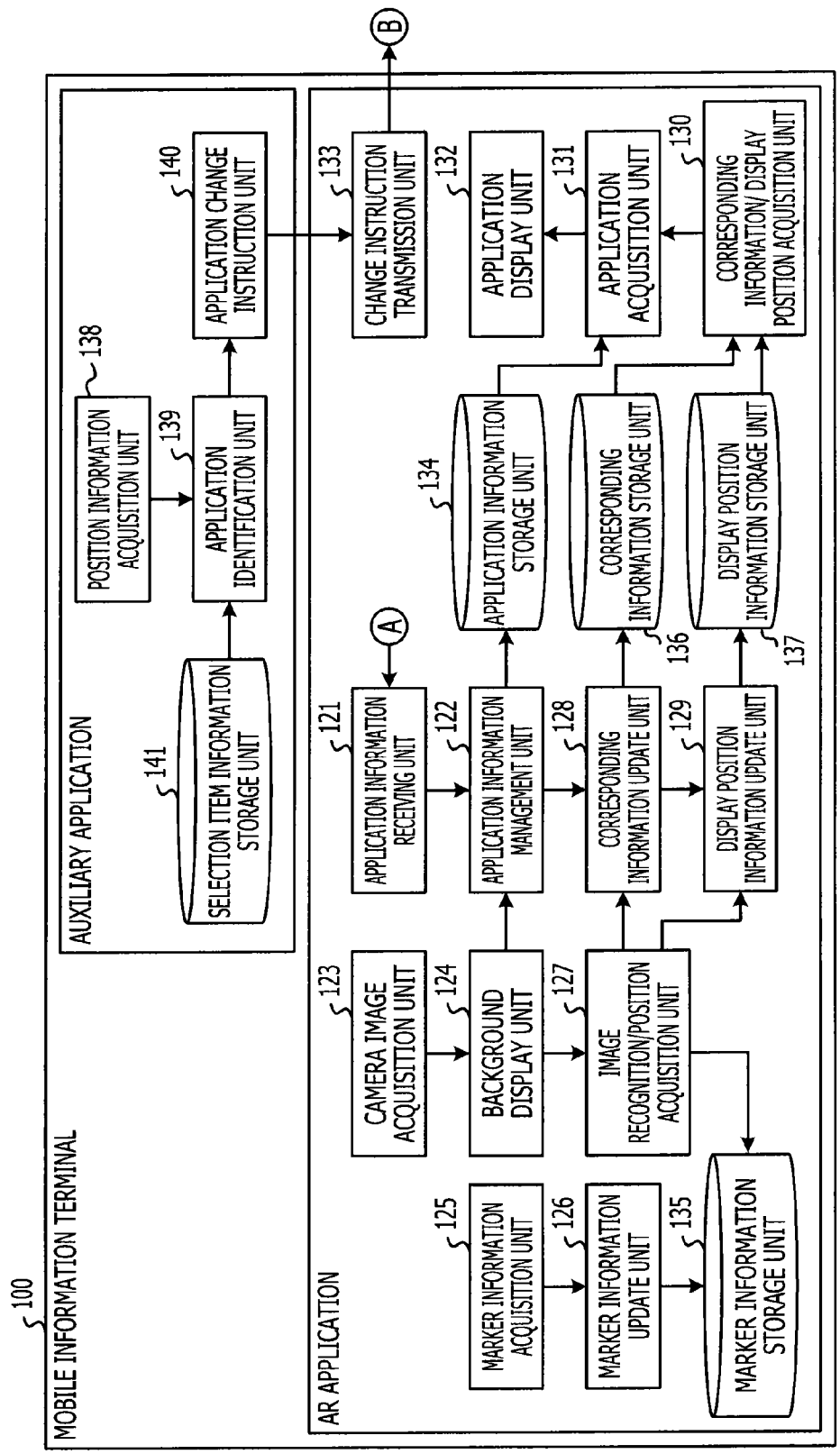
FIG. 3 is a schematic diagram of functional blocks of the mobile information terminal according to an embodiment.

FIG. 3 is a schematic diagram of functional blocks of the mobile information terminal 100 according to an embodiment.

As illustrated in FIG. 3, the mobile information terminal 100 according to the present embodiment includes an application information receiving unit 121, an application information management unit 122, a camera image acquisition unit 123, a background display unit 124, a marker information acquisition unit 125, a marker information update unit 126, an image recognition/position acquisition unit 127, a corresponding information update unit 128, a display position information update unit 129, a corresponding information/display position acquisition unit 130, an application acquisition unit 131, an application display unit 132, a change instruction transmission unit 133, an application information storage unit 134, a marker information storage unit 135, a corresponding information storage unit 136, and a display position information storage unit 137 as functional blocks.

All of these functional blocks are achieved by the CPU 101 reading the AR application (control program) into the main memory 102 and executing the AR application read into the main memory 102.

Further, the mobile information terminal 100 according to the present embodiment includes a position information acquisition unit 138, an application identification unit 139, an application change instruction unit 140, and a selection item information storage unit 141 as functional blocks.

All of these functional blocks are achieved by the CPU 101 reading the auxiliary application (control program) into the main memory 102 and executing the auxiliary applications in the main memory 102. In this regard, the auxiliary applications may be incorporated in an agenda application described later.

The application information receiving unit 121 receives from the application server 200 an application installation instruction and an application uninstallation instruction. The application information receiving unit 121 notifies a transmission request of an application to the transmission-source application server 200 based on an installation instruction from the application server 200, and receives the application from the application server 200. An application includes an application file and application information. The application file includes a program that realizes functions of the application. The application information includes an application ID and a keyword. The application ID is identification information that identifies the application. The keyword is a character string related to the application. For the keyword, for example, a name of the application (application name), a creator name, a classification, a purpose, creation date and time, a creation site, a use site, use date and time, a use period, and so on may be used.

Further, the application information receiving unit 121 according to the present embodiment receives from the application server 200 the application information changed by the application server 200.

The application information management unit 122 stores the application file and the application information from the application server 200 in an application information table T1 stored in the application information storage unit 134. The application information management unit 122 deletes a specified application file and application information from the application information table T1 based on an uninstallation instruction from the application server 200. Also, the application information management unit 122 obtains a keyword of the application, that is to say, a keyword included in the application information from the application information table T1.

Further, the application information management unit 122 according to the present embodiment updates (changes) the application information recorded in the application information table T1 using the application information changed by the application server 200.

The camera image acquisition unit 123 obtains an image captured by the camera 109, that is to say, a camera image.

The background display unit 124 displays a camera image captured by the camera image acquisition unit 123 on the display 106 as a background image.

The marker information acquisition unit 125 obtains marker information from the marker information server 300. The marker information includes a marker ID, image data, and a keyword. The marker ID is identification information for identifying a marker. In this regard, the marker is not limited in particular, but is attached to a target object (object), such as a whiteboard, and so on, for example, and is used for specifying the target object or a part of the object. A common marker may be attached to a plurality of target objects. A plurality of markers that are not in common may be attached to one target object. For a marker, for example, a barcode, a Quick Response Code (QR code), and so on may be used. The marker ID is identification information for identifying a marker. The image data is image data of the marker. The keyword is a character string related to an application to be displayed in association with the marker. For the keyword, for example, a name of an application (an application name) to be displayed in association with the marker, a display period, and so on may be used.

The marker information update unit 126 updates a marker information table T2 stored in the marker information storage unit 135 based on the marker information obtained by the marker information acquisition unit 125.

The image recognition/position acquisition unit 127 obtains image data of the marker from the marker information table T2 stored in the marker information storage unit 135, and determines whether the marker is included in the background image displayed by the background display unit 124. If the marker is included in the background image, the image recognition/position acquisition unit 127 calculates the position of the marker with respect to the display 106 based on the image data of the marker. The image recognition/position acquisition unit 127 also obtains a keyword of the marker, that is to say, a keyword included in the marker information from the marker information table T2.

The corresponding information update unit 128 associates the marker and an application, based on the keyword of the marker obtained by the image recognition/position acquisition unit 127 and the keyword of the application obtained by the application information management unit 122.

The display position information update unit 129 calculates the display position of the application, based on the position of the marker obtained by the image recognition/position acquisition unit 127. The display position is a display range of the application. Further, the display position information update unit 129 updates a display position information table T4 stored in the display position information storage unit 137 based on the display position of the application.

The corresponding information/display position acquisition unit 130 obtains a corresponding relationship between the marker and the application from a corresponding information table T3 stored in the corresponding information storage unit 136. Further, the corresponding information/display position acquisition unit 130 obtains the display position of the application from the display position information table T4 stored in the display position information storage unit 137.

The application acquisition unit 131 identifies an application tied to each display position based on the corresponding relationship obtained by the corresponding information/display position acquisition unit 130, and obtains an application file from the application information storage unit 134.

The application display unit 132 displays an execution screen of the application obtained by the application acquisition unit 131 at the display position obtained by the corresponding information/display position acquisition unit 130. In this regard, a display position is set for each marker, and thus displaying an execution screen of the application at the display position is equivalent to displaying the application correspondingly to the marker.

The change instruction transmission unit 133 transmits an application information change instruction to the application server 200 based on an application change instruction notified from the application change instruction unit 140. The application information change instruction includes a keyword of the application specified by a user of the mobile information terminal 100, that is to say, an application ID of the specified application, and a keyword to be added to the application information of the specified application.

The position information acquisition unit 138 obtains position information of a contact position by the user of the mobile information terminal 100 based on the detection result of the touch screen 107.

The application identification unit 139 identifies, based on the position information obtained by the position information acquisition unit 138, an application specified by the user of the mobile information terminal 100, that is to say, a specified application out of a plurality of applications stored in the mobile information terminal 100.

The application change instruction unit 140 notifies an instruction for changing an application being displayed, that is to say, a display application change instruction to the transmission unit 133. The application change instruction includes an application ID of the application specified by the user of the mobile information terminal 100, that is to say, an application ID of a specified application.

The application information storage unit 134 stores the application information table T1.

The marker information storage unit 135 stores the marker information table T2.

The corresponding information storage unit 136 stores the corresponding information table T3.

The display position information storage unit 137 stores the display position information table T4.

The selection item information storage unit 141 stores a selection item information table T5.

The application information table T1, the marker information table T2, the corresponding information table T3, the display position information table T4, and the selection item information table T5 are described later in detail.

Application Information Table T1

FIG. 4 is a structure diagram of the application information table T1 according to an embodiment.

As illustrated in FIG. 4, the application information table T1 ties an application name, an application file, and a keyword to an application identified by each application ID. The application name is a name of the application. The application file includes a program that realizes a function of the application. The keyword is a character string related to the application. For the keyword, for example, a name of an application (an application name), a creator name, a classification, a purpose, creation date and time, a creation site, a use site, use date and time, a use period, and so on may be used.

For example, in a specific example described in the first row of the table, "minutes" as an application name, "vvvv.html" as an application file, and "now" as a keyword is tied to an application identified by an application ID "vvvv". In a specific example described in the second row of the table, "item 1" as an application name, "wwww.html" as an application file, and "item 1" as a keyword are tied to an application identified by an application ID "wwww".

Marker Information Table T2

Figure 5:
FIG. 5 is a structure diagram of a marker information table according to an embodiment.

FIG. 5 is a structure diagram of the marker information table T2 according to an embodiment.

As illustrated in FIG. 5, the marker information table T2 ties image data and a keyword to a marker identified by each marker ID. The image data is image data of a marker. The keyword is a character string related to an application to be displayed correspondingly to a marker. For a keyword, for example, a name of an application (an application name), a display period, and so on that are to be displayed correspondingly to a marker may be used.

For example, in a specific example described in the first row of the table, "xxx.png" as image data and "agenda" as a keyword are tied to a marker identified by a marker ID "aaaa". In a specific example described in the second row of the table, "yyy.png" as image data and "now" as a keyword are tied to a marker identified by a marker ID "bbbb".

Corresponding Information Table T3

Figure 6:
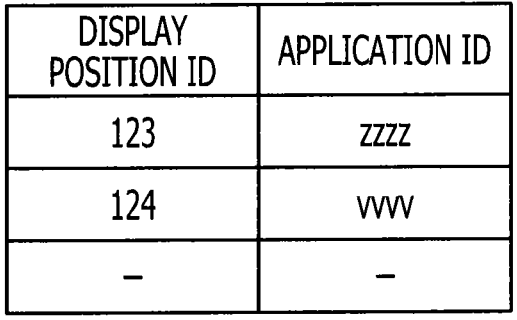
FIG. 6 is a structure diagram of a corresponding information table according to an embodiment.

FIG. 6 is a structure diagram of a corresponding information table T3 according to an embodiment.

As illustrated in FIG. 6, the corresponding information table ties an application identified by an application ID to a display position identified by each display position ID. The display position is set to each marker.

For example, in a specific example described in the first row of the table, an application identified by an application ID "zzzz" is tied to a display position identified by a display position ID "123". In a specific example described in the second row of the table, an application identified by an application ID "vvvv" is tied to a display position identified by a display position ID "124".

Display Position Information Table T4

FIG. 7 is a structure diagram of a display position information table T4 according to an embodiment.

As illustrated in FIG. 7, the display position information table T4 ties a display range and a keyword to a display position identified by each display position ID. The display range is a display range of an application. In the present embodiment, as a display range, coordinate components "x" and "y" that define a reference position, and a width "w" and a height "h" that define a size of a display range are used. Here, the keyword is a keyword tied to a marker ID, that is to say, a keyword of a marker. That is to say, the display position information table T4 stores a keyword of a marker in association with a display position ID.

For example, in a specific example described in the first row of the table, (15, 24, 80, 80) as a display range (x, y, w, h) and "agenda" as a keyword are tied to a display position identified by a display position ID "123". In a specific example described in the second row of the table, (208, 340, 90, 80) as a display range (x, y, w, h) and "now" as a keyword are tied to a display position identified by a display position ID "124".

Selection Item Information Table T5

FIG. 8 is a structure diagram of a selection item information table T5 according to an embodiment.

As illustrated in FIG. 8, the selection item information table T5 ties a display range and an application ID to a selection item identified by each selection item ID. The display range is a display range of a selection item displayed on an execution screen of an agenda application described later. In the present embodiment, as a display range, coordinate components "x" and "y" that define a reference position and a width "w" and a height "h" that define a size of a display range are used.

For example, in a specific example described in the first row of the table, (15, 10, 80, 30) as a display range (x, y, w, h) and "vvvv" as an application ID are tied to a selection item identified by a selection item ID "001". In a specific example described in the second row of the table, (15, 25, 80, 30) as a display range (x, y, w, h) and "wwww" as an application ID are tied to a selection item identified by a selection item ID "002".

Hardware Configuration of Application Server 200

Figure 9:
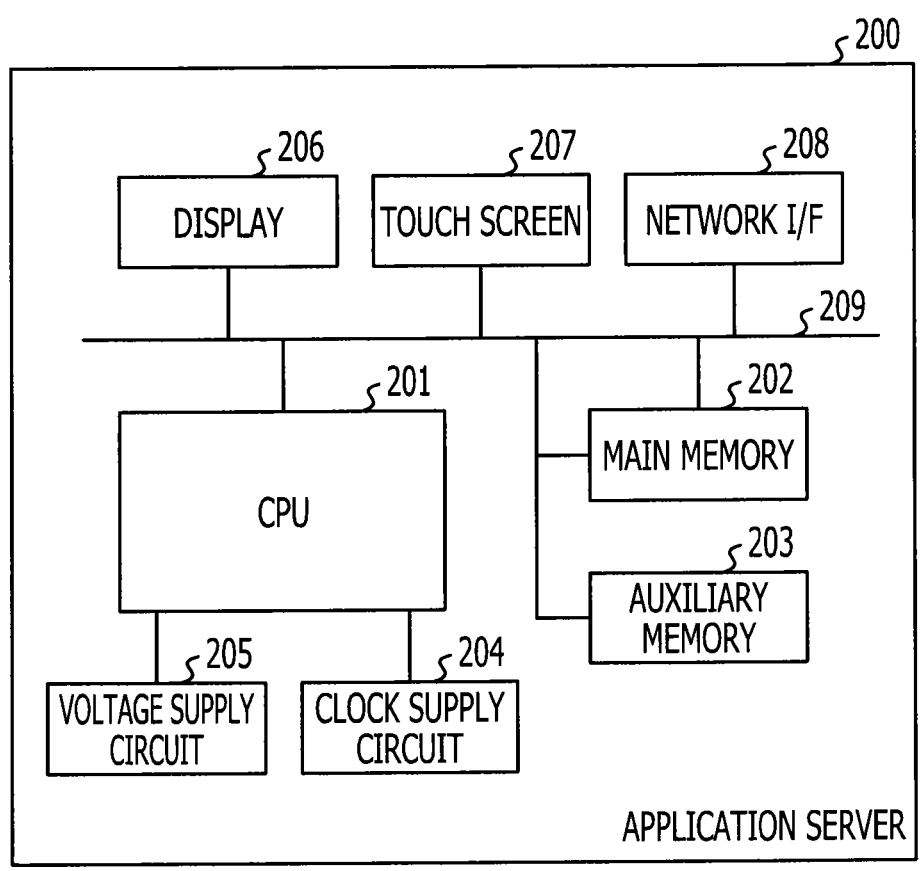
FIG. 9 is a schematic diagram of a hardware configuration of an application server according to an embodiment.

FIG. 9 is a schematic diagram of a hardware configuration of an application server 200 according to an embodiment.

As illustrated in FIG. 9, the application server 200 according to the present embodiment includes a CPU 201, a main memory 202, an auxiliary memory 203, a clock supply circuit 204, a voltage supply circuit 205, a display 206, a touch screen 207, and a network I/F 208 as hardware modules. These hardware modules are mutually connected through a bus 209, for example.

These hardware modules correspond to the CPU 101, the main memory 102, the auxiliary memory 103, the clock supply circuit 104, the voltage supply circuit 105, the display 106, the touch screen 107, and the network I/F 108 of the mobile information terminal 100, respectively, and thus the descriptions thereof are omitted.

Functional Blocks of Application Server 200

Figure 10:
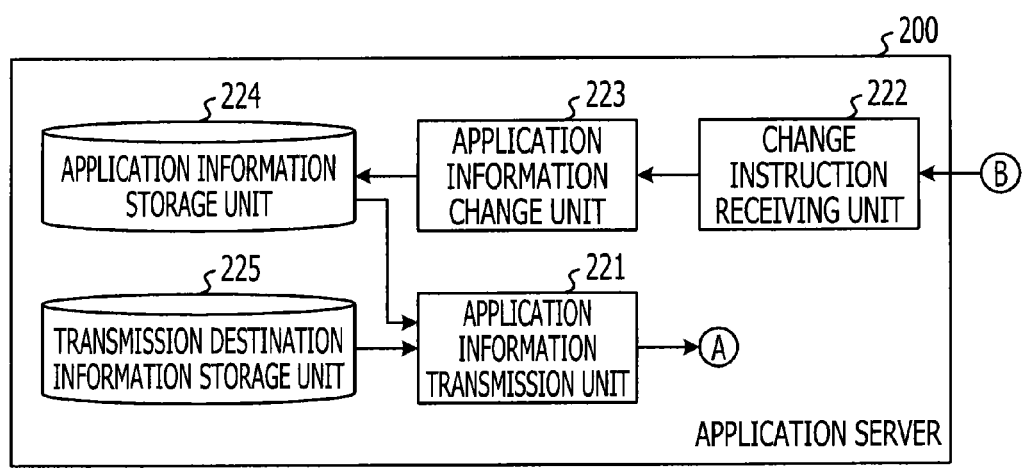
FIG. 10 is a schematic diagram of functional blocks of the application server according to an embodiment.

FIG. 10 is a schematic diagram of functional blocks of an application server 200 according to an embodiment.

As illustrated in FIG. 10, the application server 200 according to the present embodiment includes an application information transmission unit 221, a change instruction receiving unit 222, an application information change unit 223, an application information storage unit 224, and a transmission destination information storage unit 225 as functional blocks.

All of these functional blocks are realized by the CPU 201 reading the control program into the main memory 202 and executing the control program read into the main memory 202.

The application information transmission unit 221 transmits an application installation instruction or an application uninstallation instruction to the mobile information terminal 100, based on a context of the mobile information terminal 100, and so on, for example. The application information transmission unit 221 transmits an application stored in the application information storage unit 224, that is to say, an application file and application information to the mobile information terminal 100, based on an application transmission request from the mobile information terminal 100. Further, if application information is changed by the application information change unit 223, the application information transmission unit 221 transmits the application information changed by the application information change unit 223 to the mobile information terminal 100. At this time, the application information transmission unit 221 might not transmit all of the application information to the mobile information terminal 100, but may selectively transmit to the mobile information terminal 100 only the information changed among the application information.

The change instruction receiving unit 222 receives an application information change instruction from the mobile information terminal 100.

The application information change unit 223 changes an application information table T7 stored in the application information storage unit 224, based on the application information change instruction received by the change instruction receiving unit 222. For example, if the application information change instruction is a keyword change instruction, the application information change unit 223 changes the keyword recorded in the application information table T7.

The application information storage unit 224 stores the application information table T7.

The transmission destination information storage unit 225 stores a transmission destination information table T6.

Transmission Destination Information Table T6

Figure 11:
FIG. 11 is a structure diagram of a transmission destination information table according to an embodiment.

FIG. 11 is a structure diagram of the transmission destination information table T6 according to an embodiment.

As illustrated in FIG. 11, the transmission destination information table T6 ties a transmission destination address to a service identified by each service ID. The service is a service provided by the application push system according to the present embodiment. For an example of the service, a service is provided that automatically distributes an application to the mobile information terminal 100 based on a context of the mobile information terminal 100. The transmission destination address is an address of a mobile information terminal with which a user subscribes to the service, for example.

For example, in a specific example described in the first row of the table, "oooo", "pppp", "qqqq", and "rrrr" as transmission destination addresses are tied to a service identified by a service ID "ffff". In a specific example described in the second row of the table, "ssss" and "tttt" as transmission destination addresses are tied to a service identified by a service ID "gggg".

Application Information Table T7

FIG. 12 is a structure diagram of the application information table T7 according to an embodiment.

As illustrated in FIG. 12, the application information table T7 is the same as the application information table T1 stored in the application information storage unit 134 of the mobile information terminal 100. Accordingly, description of the details of the application information table T7 is omitted. However, application information recorded in the application information table T1 is all recorded in the application information table T7, but application information recorded in the application information table T7 is sometimes not recorded in the application information table T1.

Marker Information Update Processing

Figure 13:
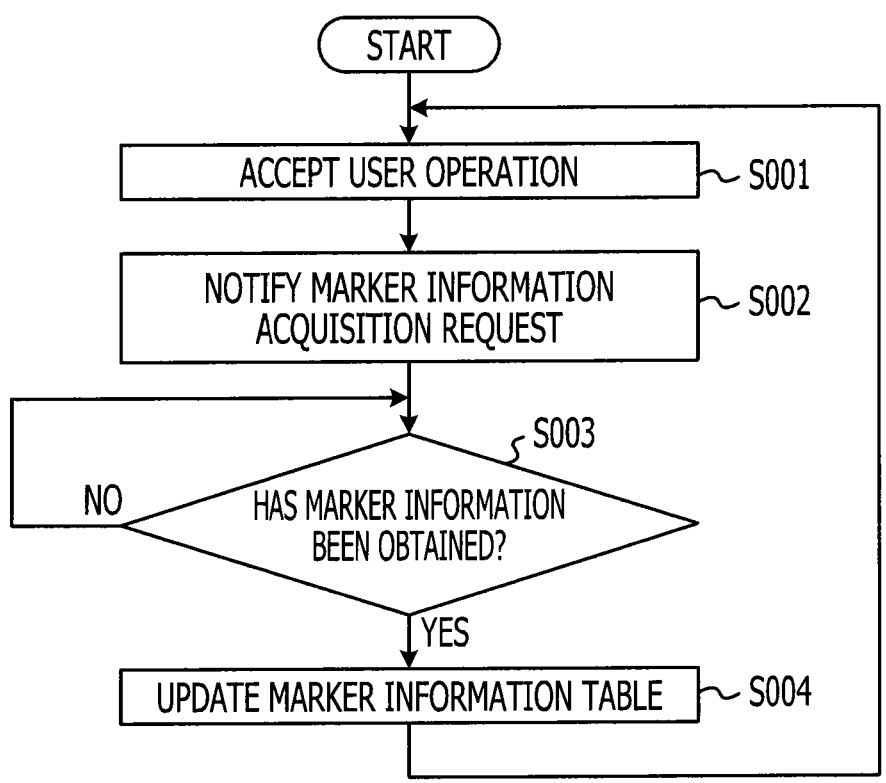
FIG. 13 is a flowchart of marker information update processing of the mobile information terminal according to an embodiment.

FIG. 13 is a flowchart of marker information update processing of the mobile information terminal 100 according to an embodiment.

As illustrated in FIG. 13, the marker information acquisition unit 125 accepts user operation for the mobile information terminal 100 (step S001). The user operation is assumed to be, for example, a user's instruction to start the AR application, instruction to update the AR application, and so on.

Next, the marker information acquisition unit 125 notifies a marker information acquisition request to the marker information server 300 (step S002). The marker information acquisition request may include context information about the user of the mobile information terminal 100, for example, the user's position information, schedule information, and so on.

Next, the marker information acquisition unit 125 determines whether marker information has been obtained from the marker information server 300 or not (step S003).

Here, if the marker information acquisition unit 125 does not determine that marker information has been obtained (No in step S003), the marker information acquisition unit 125 determines once again whether marker information has been obtained (step S003).

On the other hand, if the marker information acquisition unit 125 determines that marker information has been obtained (Yes in step S003), the marker information update unit 126 updates the marker information table T2 stored in the marker information storage unit 135 using the marker information obtained from the marker information server 300 (step S004).

In this regard, if a marker information acquisition request includes context information, the marker information server 300 may provide the mobile information terminal 100 with marker information corresponding to context information. For example, if "in conference" is obtained as context information, the marker information server 300 may provide the mobile information terminal 100 with marker information of only the marker that exists in the conference room.

Next, the marker information acquisition unit 125 accepts user operation for the mobile information terminal 100 once again (step S001).

Application Display Position Calculation Processing

Figure 14:
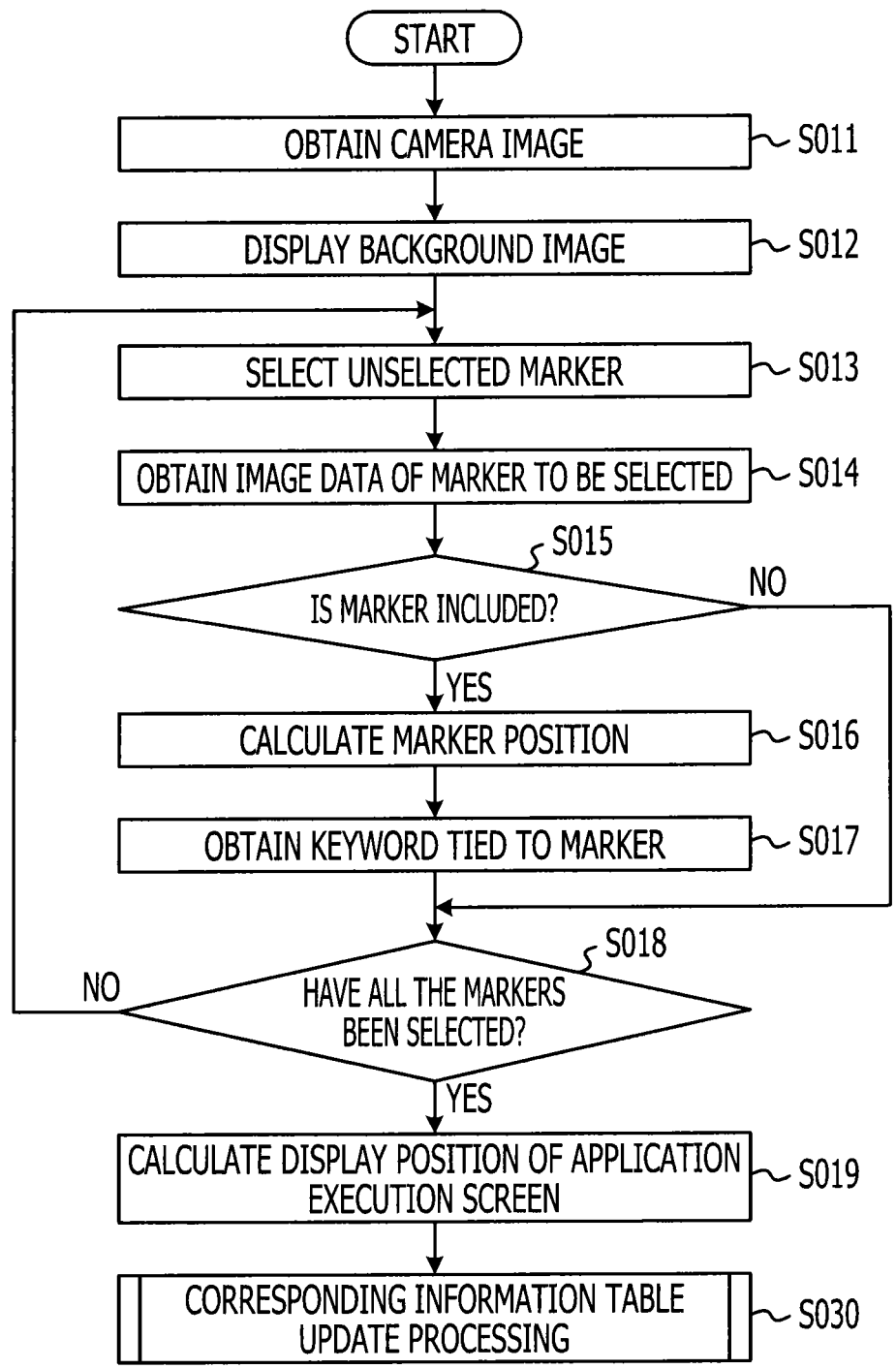
FIG. 14 is a flowchart of application display position calculation processing of the mobile information terminal according to an embodiment.

FIG. 14 is a flowchart of application display position calculation processing of the mobile information terminal 100 according to an embodiment.

As illustrated in FIG. 14, the camera image acquisition unit 123 obtains a camera image captured by the camera 109 (step S011).

Next, the background display unit 124 displays the camera image obtained by the camera image acquisition unit 123 as a background image on the display 106 (step S012).

Next, the image recognition/position acquisition unit 127 selects an unselected ID marker from marker IDs recorded in the marker information table T2 (step S013).

Next, the image recognition/position acquisition unit 127 obtains image data tied to the selected marker ID, that is to say, the marker ID of the processing target from the marker information table T2 (step S014).

Next, the image recognition/position acquisition unit 127 determines whether the image data tied to the marker ID of the processing target is included in the background image, that is to say, whether the marker identified by the marker ID of the processing target is included in the background image by using the image data tied to the marker ID of the processing target obtained from the marker information table T2 and the image data of the background image displayed by the background display unit 124 (step S015).

Here, if the image recognition/position acquisition unit 127 determines that the image data tied to the marker ID of the processing target is included in the background image (Yes in step S015), that is to say, the marker identified by the marker ID of the processing target is included in the background image, the image recognition/position acquisition unit 127 calculates the position of the marker identified by the marker ID of the processing target with respect to the background image, based on the image data tied to the marker ID of the processing target (step S016).

Next, the image recognition/position acquisition unit 127 obtains a keyword tied to the marker ID of the processing target from the marker information table T2 (step S017).

Next, the image recognition/position acquisition unit 127 determines whether all the marker IDs in the marker information table T2 have been selected or not (step S018). If the image recognition/position acquisition unit 127 does not determine that the image data tied to the marker ID of the processing target is included in the background image (No in step S015), that is to say, if the marker identified by the marker ID of the processing target is not included in the background image, the image recognition/position acquisition unit 127 determines whether all the marker IDs in the marker information table T2 have been selected or not (step S018).

Here, if the image recognition/position acquisition unit 127 determines that all the marker IDs have been selected (Yes in step S018), the display position information update unit 129 calculates a display position of the application execution screen with respect to the background image, based on the position of the marker identified by the marker ID of the processing target (step S019). Further, the display position information update unit 129 gives a display position ID to the display position of the application execution screen, and records the display position of the application execution screen in the display position table T4. The display position of the application execution screen is a display range of the application execution screen. Here, a display position ID is given to the display position of the application execution screen. However, in the present embodiment, one display position is set for each marker, and thus a marker ID may be directly used in place of a display position ID.

In this regard, the display position information update unit 129 may shift a display position of an application execution screen from a marker reference position. If a display position of an application execution screen is shifted from the marker reference position, it is possible to avoid displaying the application execution screen right above the marker.

Next, the corresponding information update unit 128 makes the transition to "corresponding information table update processing" (step S030). A detailed description of "corresponding information table update processing" is given later.

In this regard, if the image recognition/position acquisition unit 127 does not determine that all the marker IDs have been selected (No in step S018), the image recognition/position acquisition unit 127 selects, once again, an unselected marker ID from the marker IDs recorded in the marker information table T2 (step S013).

Application Information Acquisition/Deletion Processing

Figure 15:
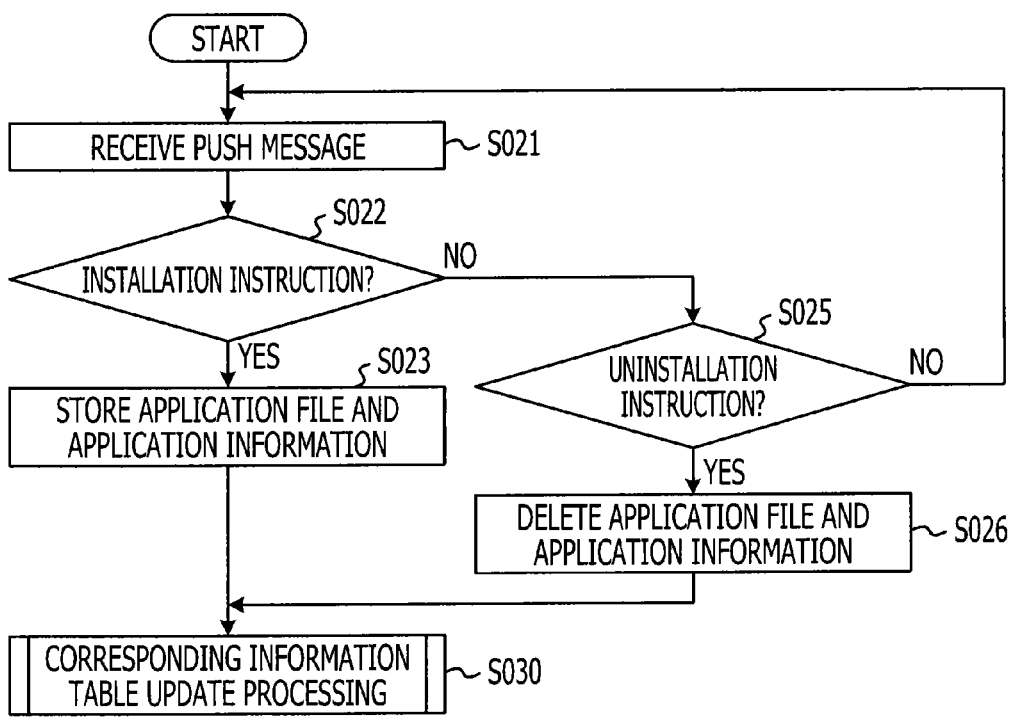
FIG. 15 is a flowchart of application information acquisition/deletion processing of the mobile information terminal according to an embodiment.

FIG. 15 is a flowchart of application information acquisition/deletion processing of a mobile information terminal according to an embodiment.

As illustrated in FIG. 15, the application information receiving unit 121 receives a push message from the application server 200 (step S021).

Next, the application information management unit 122 determines whether the push message from the application server 200 is an application installation instruction or not (step S022).

Here, if the application information management unit 122 determines that the push message is an application installation instruction (Yes in step S022), the application information management unit 122 obtains (downloads) the application specified by the installation instruction, that is to say, an application file and application information from the application server 200, and stores them in the application information table T1 (step S023). Specifically, the application information management unit 122 records the application file in "application file" of the application information table T1, and records a keyword included in the application information in "keyword" of the application information table T1. In this regard, in the present embodiment, an application file itself is recorded in the application information table T1. However, the present disclosure is not limited to this. For example, a storage destination (path) of an application file may be recorded in the "application file" of the application information table T1.

Next, the corresponding information update unit 128 makes the transition to "corresponding information table update processing" (step S030). A detailed description of "corresponding information table update processing" is given later.

On the other hand, if the application information management unit 122 does not determine that the push message is an application installation instruction (No in step S022), the application information management unit 122 determines whether the push message from the application server 200 is an application uninstallation instruction or not (step S025).

Here, if the application information management unit 122 determines that the push message is an application uninstallation instruction (Yes in step S025), the application information management unit 122 deletes the application specified by the uninstallation instruction, that is to say, the application file and the application information from the application information table T1 (step S026).

Next, the corresponding information update unit 128 performs "corresponding information table update processing" (step S030).

On the other hand, if the application information management unit 122 does not determine that the push message is an application uninstallation instruction (No in step S025), the application information receiving unit 121 continues to receive a push message from the application server 200 (step S021).

Corresponding Information Table Update Processing

Figure 16:
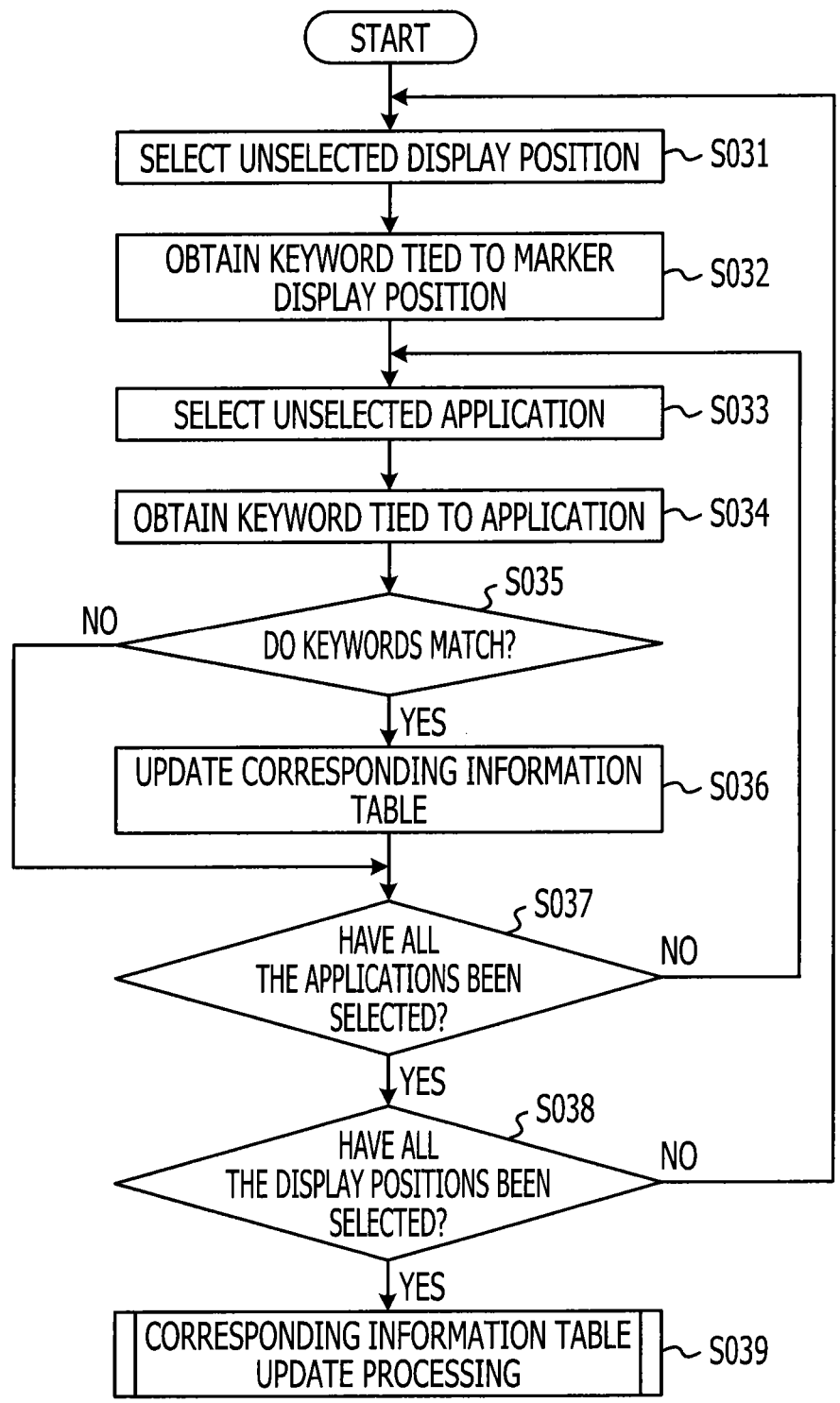
FIG. 16 is a flowchart of corresponding information table update processing of the mobile information terminal according to an embodiment.

FIG. 16 is a flowchart of corresponding information table update processing of the mobile information terminal 100 according to an embodiment.

As illustrated in FIG. 16, the corresponding information update unit 128 obtains a display position ID of a processing target from the unselected display position IDs recorded in the display position information table T4 (step S031).

Next, the corresponding information update unit 128 obtains a keyword tied to the display position ID of the processing target, that is to say, a keyword tied to the marker ID from the display position information table T4 (step S032).

Next, the application information management unit 122 obtains an application ID of the processing target from the unselected application IDs recorded in the application information table T1 (step S033).

Next, the application information management unit 122 obtains a keyword tied to the application ID of the processing target from the application information table T1 (step S034).

Next, the corresponding information update unit 128 determines whether the keyword tied to the display position ID of the processing target, that is to say, the keyword tied to the marker ID matches the keyword tied to the application ID of the processing target (step S035).

Here, if the corresponding information update unit 128 determines that the keyword tied to the display position ID, that is to say, the keyword tied to the marker ID matches the keyword tied to the application ID (Yes in step S035), the corresponding information update unit 128 updates the corresponding information table T3 (step S036). Specifically, the corresponding information update unit 128 associates the display position ID of the processing target with the application ID of the processing target, and records them in the corresponding information table T3. In this regard, tying a display position ID with an application ID is equivalent to tying the marker ID with the application ID, that is to say, tying the marker with the application.

Next, the corresponding information update unit 128 determines whether all the application IDs have been selected (step S037). If the corresponding information update unit 128 does not determine that the keyword tied to the display position ID of the processing target, that is to say, the keyword tied to the marker ID matches the keyword tied to the application ID of the processing target (No in step S035), the corresponding information update unit 128 determines whether all the application IDs have been selected (step S037).

Here, if the corresponding information update unit 128 does not determine that all the application IDs have been selected (No in step S037), the application information management unit 122 selects again an unselected application ID from the application IDs recorded in the application information table T1 (step S033).

On the other hand, if the corresponding information update unit 128 determines that all the application IDs have been selected (Yes in step S037), the corresponding information update unit 128 determines whether all the display position IDs have been selected (step S038).

Here, if the corresponding information update unit 128 does not determine that all the display position IDs have been selected (No in step S038), the corresponding information update unit 128 selects again an unselected display position ID from the display position IDs recorded in the display position information table T4 (step S031).

On the other hand, if the corresponding information update unit 128 determines that all the display position IDs have been selected (Yes in step S038), the corresponding information update unit 128 makes the transition to "application display processing" (step S039).

Application Display Processing

Figure 17:
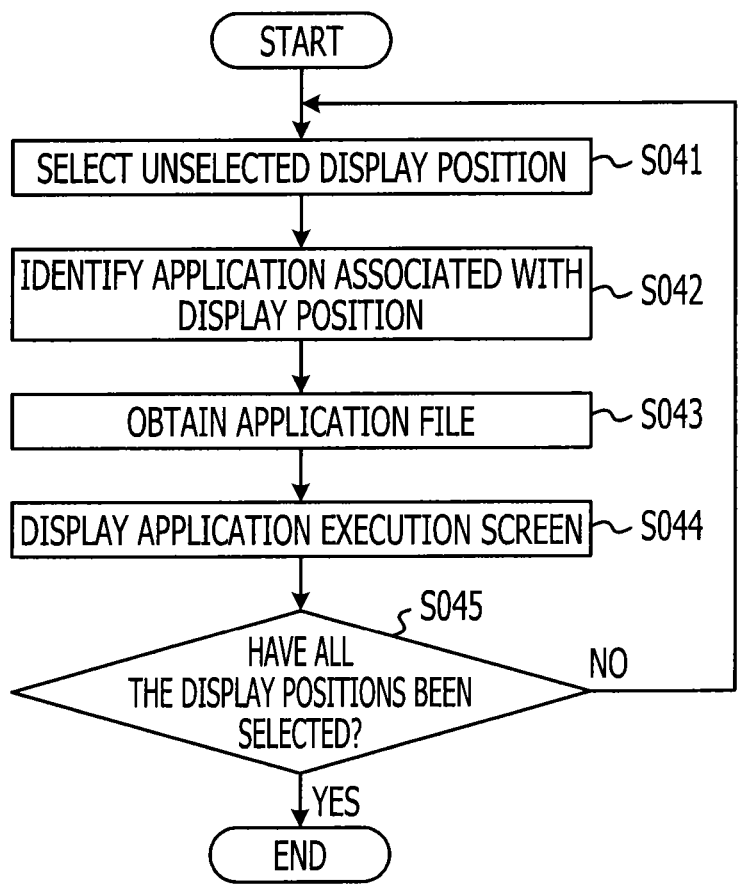
FIG. 17 is a flowchart of application display processing of the mobile information terminal according to an embodiment.

FIG. 17 is a flowchart of application display processing of the mobile information terminal 100 according to an embodiment.

As illustrated in FIG. 17, the corresponding information/display position acquisition unit 130 selects an unselected display position ID from the display position IDs recorded in the display position information table T4 (step S041).

Next, the corresponding information/display position acquisition unit 130 identifies the selected display position ID, that is to say, the application ID associated with the display position ID of the processing target from the corresponding information table T3 (step S042).

Next, the application acquisition unit 131 obtains the application file tied to the application ID from the application information table T1 (step S043).

Next, the application display unit 132 executes the application file obtained from the application information table T1 and displays an execution screen of the application at the display position identified by the display position ID of the processing target (step S044). In this regard, in the present embodiment, the application display unit 132 executes the application file and displays the execution screen of the application. However, the present disclosure is not limited to this. For example, if image data of the application execution screen is recorded in the application information table T1 separately from an application file, it is possible for the application display unit 132 to display the application execution screen based on the image data tied to the application ID.

Next, the corresponding information/display position acquisition unit 130 determines whether all the display position IDs have been selected (step S045).

Here, if the corresponding information/display position acquisition unit 130 determines that all the display position IDs have been selected (Yes in step S045), the corresponding information/display position acquisition unit 130 terminates "application display processing".

On the other hand, if the corresponding information/display position acquisition unit 130 does not determine that all the display position IDs have been selected (No in step S045), the corresponding information/display position acquisition unit 130 selects again an unselected display position ID from the display position IDs recorded in the display position information table T4 (step S041). That is to say, the processing of the steps from S041 to S044 is executed until there is no unselected display position ID recorded in the display position information table T4. In this manner, applications that are associated with any of the display position IDs recorded in the display position information table T4 are all displayed on the background image in a superimposed manner.

Change Processing of Display Application

In the following, change processing of display applications is described in detail with reference to a specific example.

Figure 18A:
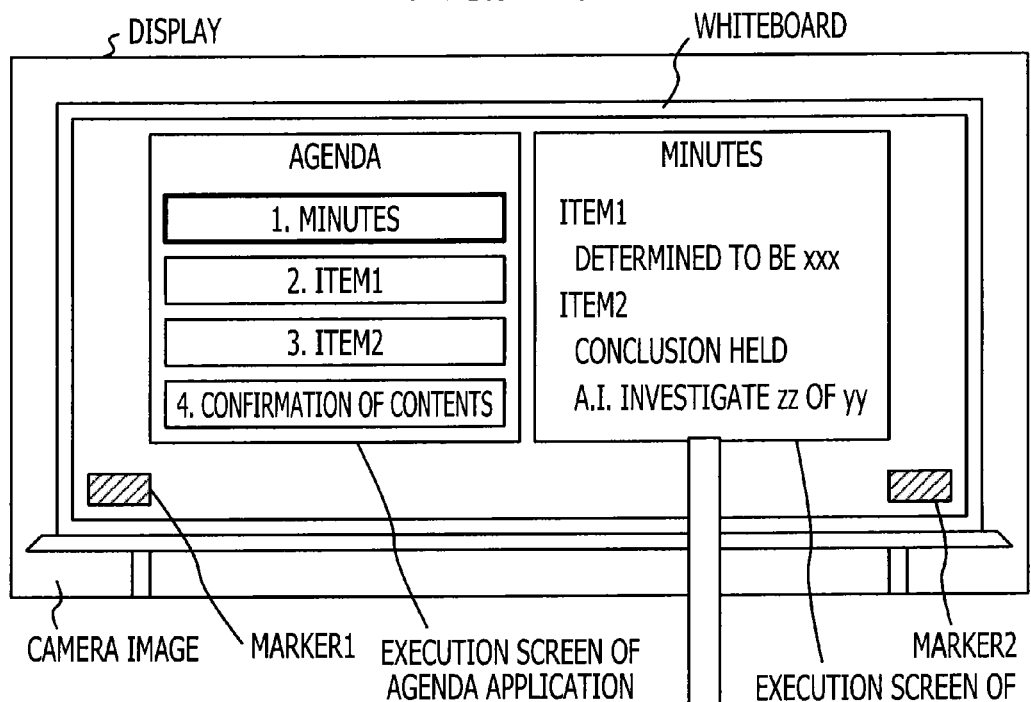
FIGS. 18A and 18B are schematic diagrams of a specific example of a camera image according to an embodiment.
Figure 18B:
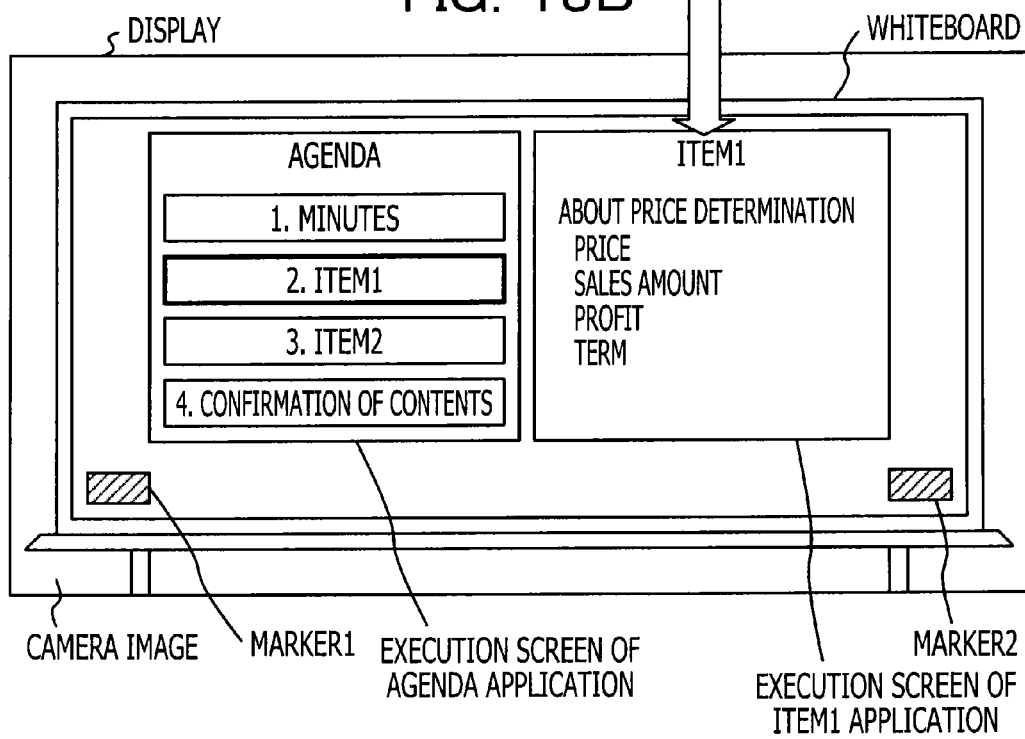
Figure 19:
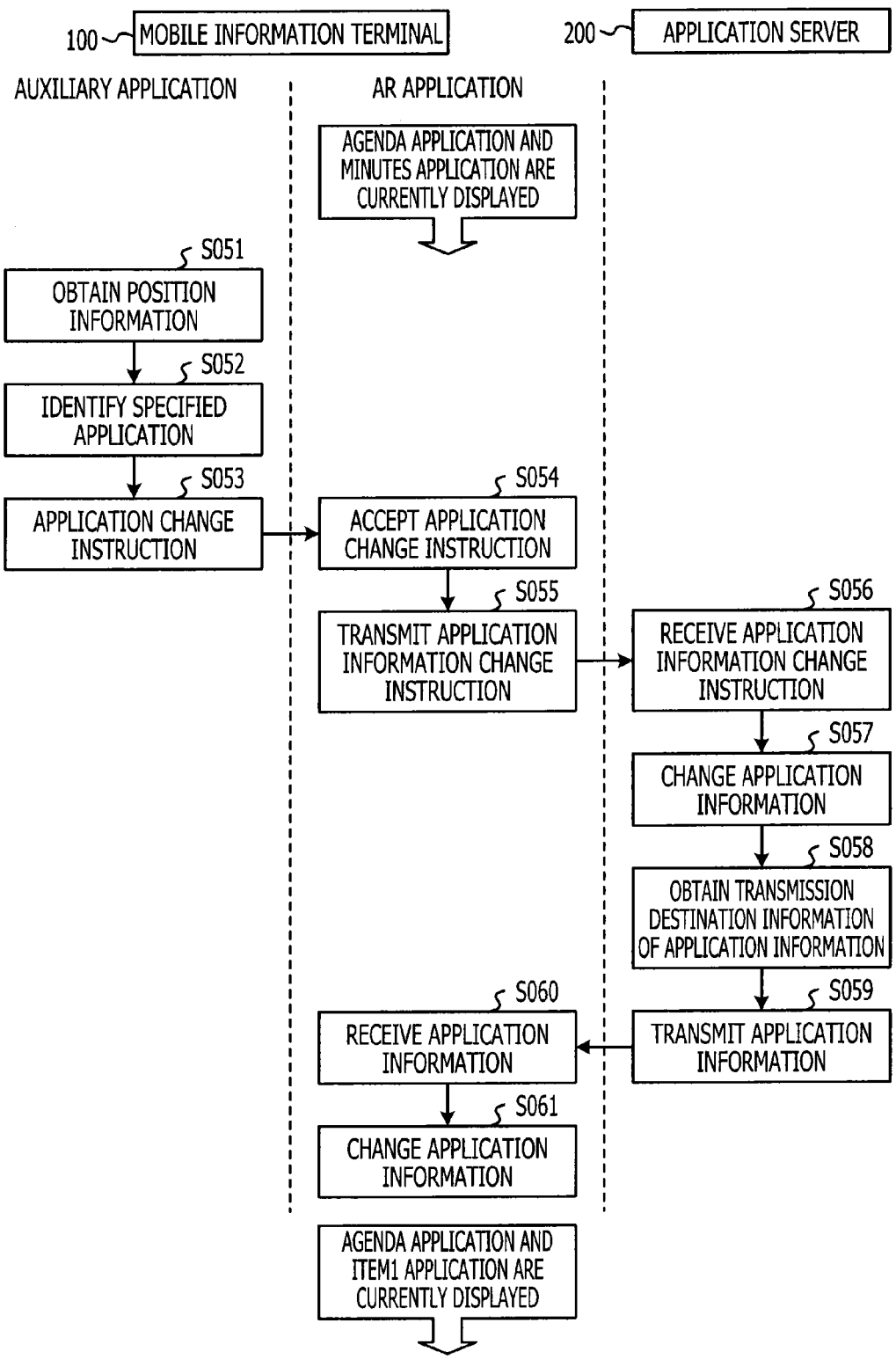
FIG. 19 is a flowchart of display application change processing of a system according to an embodiment.

FIG. 18 is a schematic diagram of a specific example of a camera image according to an embodiment. FIG. 19 is a flowchart of display application change processing of a system according to an embodiment.

Here, it is assumed that an agenda application, a minutes application, an item1 application, an item2 application, and a contents confirmation application are obtained (downloaded) by the mobile information terminal 100 in advance. Further, it is assumed that a keyword "agenda" is embedded in the application information of the agenda application, a keyword "now" is embedded in the application information of the minutes application, a keyword "agenda" is embedded in the marker information of the marker1, and a keyword "now" is embedded in the marker information of the marker2.

Under these circumstances, when "corresponding information table update processing" according to the present embodiment is performed, the agenda application is tied to the marker1, and the minutes application is tied to the marker2. Accordingly, as illustrated in FIG. 18A, the execution screens of the agenda application and the minutes application are displayed correspondingly to the marker1 and the marker2 that are attached to the whiteboard, respectively. This is assumed to be a default (before display application change) display state of this specific example.

In this regard, the execution screen of the agenda application is a screen of a table of contents such as topics of a conference, and so on. The individual topics are described on the execution screen of the agenda application as selection items that a user of the mobile information terminal 100 is allowed to select. In the present embodiment, "minutes", "item1", "item2", and "contents confirmation" are used as the topics. On the other hand, the execution screen of the minutes application includes the content of "minutes" described as a topic on the execution screen of the agenda application.

Here, if the application whose content is displayed, that is to say, the display application is changed from the minutes application to the item1 application, the user of the mobile information terminal 100 touches "item1" displayed on the execution screen of the agenda application with a fingertip, a pen point, or the like. This triggers a start of "change processing of display applications" according to the present embodiment.

As illustrated in FIG. 19, the position information acquisition unit 138 of the mobile information terminal 100 obtains position information of a contact position by the user of the mobile information terminal 100 based on the detection result of the touch screen 107 (step S051).

Next, the application identification unit 139 of the mobile information terminal 100 identifies an application specified by the user of the mobile information terminal 100, that is to say, a specified application, based on the position information obtained by the position information acquisition unit 138 (step S052). Specifically, the application identification unit 139 identifies an application ID tied to the display range including the position information obtained by the position information acquisition unit 138, based on the selection item information table T5 stored in the selection item information storage unit 141. In the present embodiment, it is assumed that the item1 application is a specified application.

Next, the application change instruction unit 140 of the mobile information terminal 100 notifies an application change instruction to the change instruction transmission unit 133 of the mobile information terminal 100 (step S053). The application change instruction includes an application ID of the specified application.

Next, the change instruction transmission unit 133 of the mobile information terminal 100 accepts an application change instruction from the application change instruction unit 140 (step S054).

Next, the change instruction transmission unit 133 of the mobile information terminal 100 transmits an application information change instruction to the application server 200 (step S055). The application information change instruction includes an application ID of the specified application and a keyword to be added to the application information of the specified application. Here, "now", which specifies a display period, is assumed to be a keyword to be added to the application information.

Next, the change instruction receiving unit 222 of the application server 200 receives an application information change instruction from the mobile information terminal 100 (step S056).

Next, the application information change unit 223 of the application server 200 changes the application information table T7 stored in the application information storage unit 224 of the application server 200 based on the application information change instruction from the change instruction receiving unit 222 (step S057). Specifically, the application information change unit 223 extracts an application ID of the specified application from the application information change instruction, and adds a keyword "now" to the application information tied to the application ID of the specified application. Further, the application information change unit 223 deletes the keyword "now" from the application information of the minutes application being displayed when the application information change instruction was received.

Next, the application information transmission unit 221 of the application server 200 obtains a transmission destination address of the application information from the transmission destination information table T6 stored in the transmission destination information storage unit 225 (step S058). Specifically, the application information transmission unit 221 obtains, from the transmission destination information table T6, the transmission destination address tied to the service ID of the service to which the user of the mobile information terminal 100 subscribes.

Next, the application information transmission unit 221 of the application server 200 transmits the application information changed by the application information change unit 223 individually to the transmission destination addresses of the application information (step S059). In this regard, the application information transmission unit 221 does not have to transmit all of the application information, and, for example, may selectively transmit information changed by the application information change unit 223, such as only a keyword, for example.

Next, the application information receiving unit 121 of the mobile information terminal 100 receives the application information from the application server 200, that is to say, the application information changed by the application server 200 (step S060).

Next, the application management unit 122 of the mobile information terminal 100 changes the application information table T1 stored in the application information storage unit 134 using the application information received by the application information receiving unit 121 (S061). In the present embodiment, the item1 application is set to the specified application, and thus the keyword "now" is added to the application information of the item1 application, and the keyword "now" is deleted from the application information of the minutes application that has been displayed so far. Accordingly, when "corresponding information table update processing" according to the present embodiment is performed, the application tied to the marker 2 is changed from the minutes application to the item1 application. Accordingly, as illustrated in FIG. 18B, the application displayed correspondingly to the marker 2 is changed from the minutes application to the item1 application.

As described above, by the present embodiment, using specification by the user of the mobile information terminal 100, a corresponding relationship between a marker and an application is changed. Accordingly, it is possible to change, with more freedom, an application to be displayed correspondingly to a marker based on a request of the user.

Further, an application information change instruction is notified from the mobile information terminal 100 to the application server 200 in order for the application server 200 to change application information (keyword). Then, the changed application information is transmitted from the application server 200 to all the mobile information terminals subscribing to the service. Accordingly, by performing "corresponding information table update processing", it is possible for the mobile information terminal to change a corresponding relationship between a marker and an application at the same time. Thus, it is possible to share a change of display applications with all the mobile information terminals subscribing to the service.

In this regard, in the present embodiment, a keyword of an application is rewritten to change a corresponding relationship between a marker and an application so that an application to be displayed correspondingly to the marker is changed. However, the present disclosure is not limited to this. For example, a keyword of a marker may be rewritten to change a corresponding relationship between a marker and an application so that an application to be displayed correspondingly to the marker is changed. That is to say, a keyword of a marker may be rewritten to a keyword of an application to be displayed correspondingly to a marker. For example, if the keyword of the marker2 is changed from "now" to "item1", by performing" corresponding information table update processing" according to the present embodiment, the item1 application is tied to the marker 2. As a result, the execution screen of the item1 application is displayed correspondingly to the marker 2.

In this regard, in the mobile information terminal 100 according to the present embodiment, a corresponding relationship between a marker and an application that have an identical keyword is recorded in the corresponding information table T3. However, the present disclosure is not limited to this. For example, if a plurality of keywords are added to a marker or an application, the mobile information terminal 100 may record a corresponding relationship between a marker and an application that have the largest number of identical keywords in the corresponding information table T3. However, both of the marker keywords and the application keywords include a specific keyword, for example, "now", which specifies a display period, the mobile information terminal 100 records a corresponding relationship between a marker and an application including "now", in the corresponding information table T3 with priority.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus comprising:
   a memory; and
   a processor coupled to the memory and configured to:
      receive a request of changing information that is displayed on an image in a superimposed manner corresponding to a position of an object included in the image;
      associate second information with the object based on the request in place of first information displayed on the image in the superimposed manner corresponding to the position of the object; and
      update an attribution of the second information based on a keyword associating with an attribution of the object to associate the second information with the object.

2. The apparatus of claim 1, wherein the processor is configured to cause to display the second information on the image in the superimposed manner with the second information corresponding to the position of the object based on the association between the second information and the object.

3. The apparatus of claim 1, wherein the processor is configured to cause to display third information on the image in the superimposed manner with the third information corresponding to a position of another object.

4. The apparatus of claim 3, wherein fourth information relating to the second information is displayed on the image within a display area of the third information on the image.

5. The apparatus of claim 4, wherein the request includes position information of the fourth information, and the processor is configured to determine the second information relates to the object to associate a second information with the object.

6. The apparatus of claim 5, wherein the position information is a touch position within a display area of the fourth information.

7. The method of claim 1, wherein the processor is configured to delete the keyword from an attribution of the first information when the second information is associated with the object.

8. The apparatus of claim 1, wherein the object is a marker that denotes the information that is displayed on the image in a superimposed manner corresponding to a position.

9. The apparatus of claim 1, wherein the marker is one of a barcode and a quick response code.

10. The apparatus of claim 1, wherein the image is an image that is taken by an imaging device.

11. The apparatus of claim 10, wherein the object is a marker that is taken by the image device in the image and that denotes the information that is displayed on the image in a superimposed manner corresponding to the position of the marker.

12. The apparatus of claim 1, wherein the apparatus is a single server including a memory and a processor coupled to the memory.

13. The apparatus of claim 1, wherein the memory is configured to store a program that causes the processor to associate the second information with the object based on the request in place of the first information displayed on the image in the superimposed manner corresponding to the position of the object.

14. A method comprising:
   receiving a request of changing information that is displayed on an image in a superimposed manner corresponding to a position of an object included in the image;
   associating, by a processor, second information with the object based on the request in place of first information displayed on the image in the superimposed manner corresponding to the position of the object; and
   updating, by the processor, an attribution of the second information based on a keyword associating with an attribution of the object to associate the second information with the object.

15. A device comprising:
   a memory; and
   a processor coupled to the memory and configured to:
      transmit a request of changing first information that is displayed on an image in a superimposed manner corresponding to a position of an object included in the image;
      receive an association between the object with second information in place of the first information, the association is generated based on the request transmitted from the device; and
      update an attribution of the second information based on a keyword associating with an attribution of the object to associate the second information with the object.

16. The device of claim 15 further comprising:
   a display configured to display the second information on the image in the superimposed manner with the second information corresponding to the position of the object based on the association between the object and the second information.

17. The device of claim 15, wherein the device is a mobile information terminal.

* * * * *